US008725582B2

(12) United States Patent
Agnihotri

(10) Patent No.: US 8,725,582 B2
(45) Date of Patent: May 13, 2014

(54) MULTIMEDIA SYSTEM BASED E-COMMERCE

(75) Inventor: Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1134 days.

(21) Appl. No.: 12/041,665

(22) Filed: Mar. 4, 2008

(65) Prior Publication Data

US 2009/0228292 A1 Sep. 10, 2009

(51) Int. Cl.
*G06Q 30/00* (2012.01)

(52) U.S. Cl.
USPC ........................................... 705/26.1

(58) Field of Classification Search
USPC ........................... 705/26, 27, 26.1
See application file for complete search history.

(56) References Cited

U.S. PATENT DOCUMENTS

| | | | |
|---|---|---|---|
| 5,539,450 A | 7/1996 | Handelman | |
| 5,878,141 A | 3/1999 | Daly et al. | |
| 2002/0073416 A1 | 6/2002 | Ramsey Catan | |
| 2002/0120934 A1* | 8/2002 | Abrahams | 725/60 |
| 2002/0184623 A1* | 12/2002 | Hodge et al. | 725/37 |
| 2005/0115816 A1* | 6/2005 | Gelfond et al. | 200/339 |
| 2006/0230123 A1 | 10/2006 | Simmons et al. | |
| 2008/0098433 A1* | 4/2008 | Hardacker et al. | 725/52 |
| 2008/0140532 A1* | 6/2008 | Johnson et al. | 705/14 |
| 2008/0143481 A1* | 6/2008 | Abraham et al. | 340/10.1 |

OTHER PUBLICATIONS http://www.usatoday.com/money/industries/retail/2005-05-24-t-commerce-usat__x.htm. Article entitled: "Networks Hope Remote-Control Shopping Clicks", May 5, 2005 by Lorrie Grant.
http://www.alticast.com/pressroom/pressrom_release_read.html. Article entitled: "SkyLife First to Launch Commercial T-Commerce Services USing Alticast Solutions for DVP-MHP". Nov. 14, 2003-Seoul, Korea.
http://www.english.etnews.co.kr/news/detail.html?id=200512060001. Article entitled: "Cable Home Shopping Firms to Launch t-Commerce Service" Dec. 6, 2005 by Jang Ji-Yeong.
http://www.espial.com/index.php? Article entitled: "DigiSoft and Espial Bridge the Digital Divide-Enabling Customizable T-commerce Solutions for OCAP and MHP based Broadcasters" Apr. 27, 2004.
http://www.apb-news.com. Article entitled: "S'pore first in ASEAN to roll out HDTV" Feb. 22, 2007 by Millette Burgos.

* cited by examiner

*Primary Examiner* — Mila Airapetian
(74) *Attorney, Agent, or Firm* — John L. Rogitz

(57) ABSTRACT

E-commerce techniques, in accordance with embodiments of the present technology, provide an improved buying experience integrated with the television viewing experience. A multimedia system for implementing the e-commerce techniques includes a two way communication system such as a set top box, display device and remote controller. The set top box and display device are used to present enhanced content including one or more offerings to users. The users can use the remote control to complete a purchase transaction for one or more of the offerings.

19 Claims, 3 Drawing Sheets

MULTIMEDIA SYSTEM BASED E-COMMERCE

BACKGROUND OF THE INVENTION

There are a number of multimedia based e-commerce techniques. For example, conventional multimedia system based e-commerce techniques include television shopping channels, infomercials, pay-per-view content programming and on-demand content programming. However, current e-commerce techniques typically require the user to use the telephone, an internet enabled computer, or specialized remote controller to complete a purchase transaction. The need to use such additional devices detracts from the viewing experience and impedes impulse shopping. Accordingly, there is a continued need for multimedia system based e-commerce techniques that improve the user's viewing experience, can capitalize on impulse shopping, and the like.

SUMMARY OF THE INVENTION

Embodiments of the present technology are directed toward multimedia system based e-commerce techniques. In one embodiment, an e-commerce method includes a two way communication system for receiving enhanced content including an offering. The enhanced content is output to a user on a display device. The display device or two way communication system receives a trigger from user activation of a given remote control input indicating the selection of the offering. The indication of the selection of the offering is sent by the two way communication system to a service provider in response to the trigger. Additional information concerning the offering is then received by the two way communication system from the service provider. The additional information concerning the offering is output to the user on the display device. One or more additional triggers are received by the display device or two way communication device from user activation of one or more remote control inputs indicating selection or input of one or more parameters or attributes concerning the additional information about the offering. The indication of selection or input of one or more parameters or attributes is sent to the service provider by the two way communication system. Therefore, the entire transaction may be completed through the multimedia system using a standard remote control.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
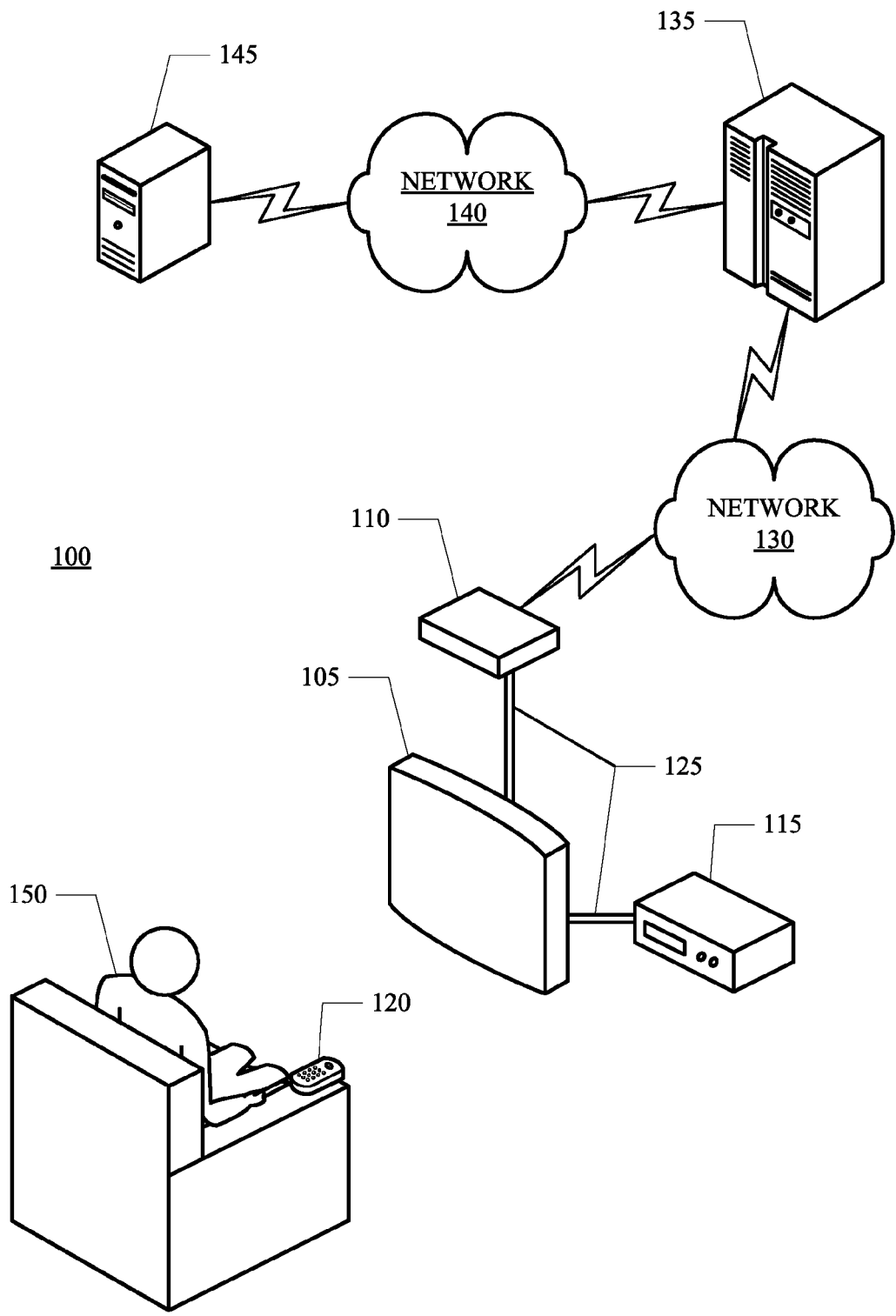
FIG. 1 shows a block diagram of an e-commerce system, in accordance with one embodiment of the present technology.

Referring to FIG. 1, an e-commerce system 100, in accordance with one embodiment of the present technology, is shown. The e-commerce system 100 includes a multimedia system 105-125 coupled to one or more networks 130, 140. Typically, the multimedia system 105-125 is coupled to a network of a service provider 135 (e.g., cable or satellite provider). Additional networks 140 may communicatively couple one or more product and/or service vendors 145 to the service provider 135.

The multimedia system 105-125 includes at least one display device 105 (e.g., television or monitor), one or more content sources 110, 115 directly or indirectly coupled to the display 105, and a remote controller 120. The one or more content sources 110, 115 include a two way communication system 110 for receiving content from a service provider 135. In one implementation, the two way communication system 110 may be a set top box, such as cable tuner or satellite tuner. In another implementation, the two way communication system 110 may be network TV with source over IP. The content sources 110, 115 may also include other consumer electronic devices such as CD/DVD player 115, VCR, DVR, game console, stereo, personal computer and/or the like. The remote controller 120 can be used by the user 150 to control the content sources 110, 115 and display 105. In addition, individual content sources 110, 115 and/or the display 105 can command and control each other without user 150 intervention.

In one implementation, the display 105 and content sources 110, 115 are coupled by a Consumer Electronic Control (CEC) compliant bus. For instance, in one implementation, the display 105 and content sources 110, 115 are coupled by high definition multimedia interface (HDMI) cables 125 and the display 105 and each content source 110, 115 includes a CEC protocol based communication interface (e.g., CEC compliant transceiver). CEC enables automatic equipment discovery and simple "one touch" operation in HDMI-interfaced consumer electronic devices. The HDMI is a "party line" serial bus that connects up to ten audio/visual devices through standard HDMI cabling. The HDMI standard utilizes the CEC protocol to provide high-level control functions between devices in an HDMI network. The CEC protocol includes automatic mechanisms for physical address (e.g., topology) discovery, logical (e.g., product type based) addressing, arbitration, retransmission, broadcasting and routing control. Message opcodes support both device specific (e.g., set-top box, DTV and player) and general features (e.g., for power signal routing, remote control pass-through, and on-screen display).

The service provider 135 delivers multimedia content to a user through the two way communication system 110 (e.g., set top box). The service provider 135 may also provide products and services for purchase by the user 150, such as on demand movies and pay-per-view content, subscription based content such as premium channels and the like. Additionally, other vendors 145 may provide products and services such as electronics, jewelry, food, clothing, travel, hotel accommodations, and the like for purchase by the user 150 through the service provider 135.

Figure 2A:
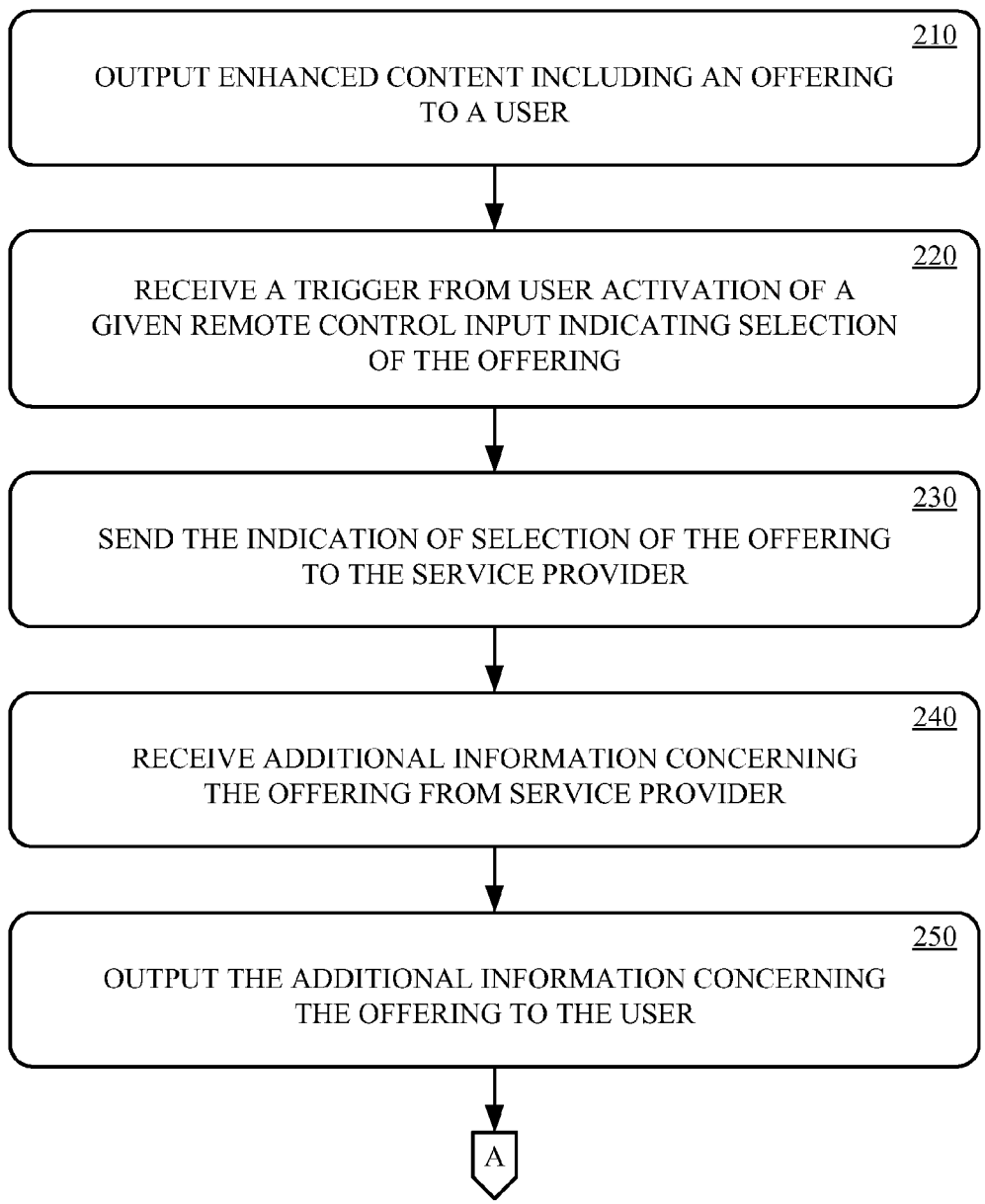
FIGS. 2A and 2B show a flow diagram of an e-commerce method, in accordance with one embodiment of the present technology.
Figure 2B:
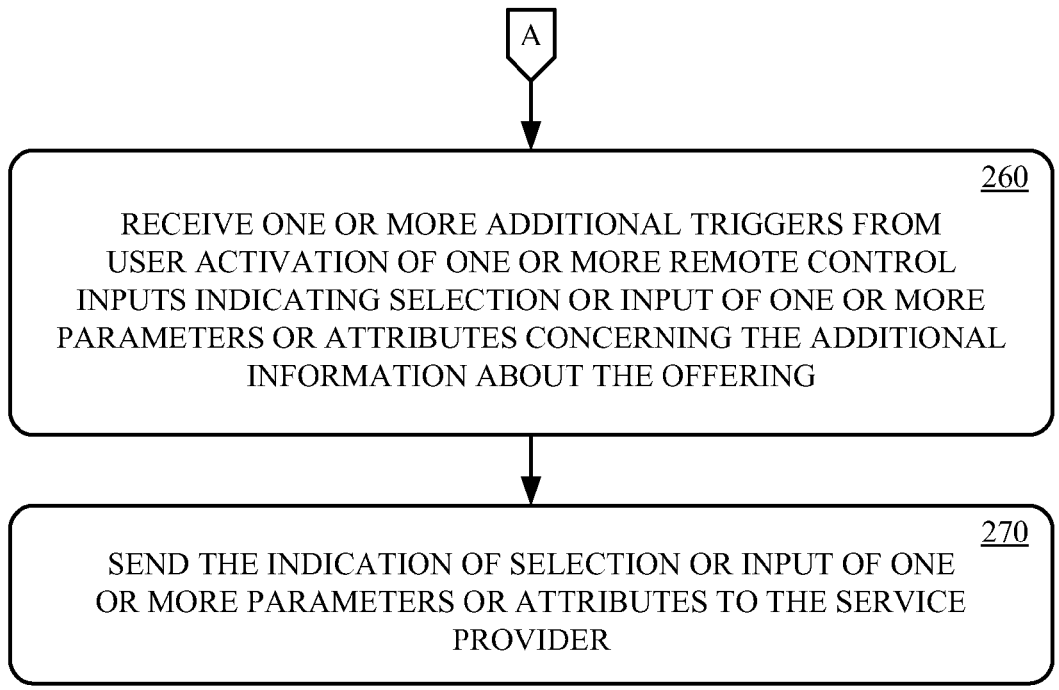

Operation of the e-commerce system 100 will be further explained with reference to FIGS. 2A and 2B, which show an e-commerce method 200 in accordance with one embodiment of the present technology. The method 200 includes outputting enhanced content on the display device 105 of the e-commerce system 100, at 210. The enhanced content includes an offering to a user. The offering may concern one or more products and/or services offered by the service provider 135 and/or one or more vendors 145. The enhanced content may be received from the service provider 135 by the set top box 110. The set top box 110 may encode the enhanced content using the CEC protocol or the like. The CEC encoded enhanced content may then be communicated to the display 105 on the HDMI link 125. The display device 105 may decode the CEC encoded enhanced content and render the enhanced content to the user 150 as audio and/or video.

The enhanced content includes control information concerning a trigger for selecting the offering. The control information may indicate that the activation of one or more buttons on the remote control is a trigger for indicating selection of the associated offering included in the enhanced content. The enhanced content may also include a visual and/or audio indication of the trigger associated with the offering.

At 220, a trigger is received as a result of user 150 activation of a given remote control 120 input. The trigger is an indication of the selection of the offering by the user 150. In one implementation, the user 150 may press a button on the remote 120, such as the enter button, to activate the trigger. The enter button may be specified by the control information to be the trigger because pressing enter normally is not a valid input unless preceded by pressing one or more other button. However, it is appreciated that activation of any other button or sequence of buttons that is not currently a valid input for any other purpose may be used. Generally, the remote control 120 generates a CEC protocol encoded control packet indicating activation of the given button. The display 105 or two way communication system 110 (e.g., set top box) receives the control packet and recognizes it as the trigger indicating selection of the offering by the user 150.

At 230, the indication of the selection of the offering is sent to the service provider 135. For network TV, the TV would either consume the CEC command and pass the corresponding trigger to a network stack, or if IP is an external module, pass along the CEC command to the external IP module. At 240, additional information concerning the offering is received from the service provider 135 in response to the sent indication of the selection of the offering. At 250, the additional information concerning the offering is output on the display 105 to the user 150. The additional information may provide for selection or specifying one or more parameters and/or attributes associated with the offering. For example, the additional information may indicate available choices and allow for selection of the choices and/or entry of additional details for completing a transaction concerning the offering via the remote controller 120.

The additional information may be received by the two way communication system 110 (e.g., set top box) as additional enhanced content. The two way communication 110 may encode the additional enhanced content using the CEC protocol. The CEC encoded additional enhanced content may then be communicated to the display 105 through HDMI 125 connection. The display device 105 may decode the CEC encoded additional enhanced content and render the additional enhanced content to the user 150 as audio and/or video. The additional enhanced content may replace the original content (e.g., television show, movie or commercial), be presented in a picture-in-picture pane in the original content, overlaid over the original content, or the like. For instance, the additional enhanced content may be overlaid as one of a plurality of layers of a graphics plane with one or more planes being partially transparent so that the additional information is viewable along with the original content. The additional enhanced content also includes control information concerning one or more triggers for selection or input of the one or more parameters or attributes using the remote controller.

At 260, triggers from user activation of one or more remote control inputs indicating selection or input of one or more parameters or attributes concerning the additional information about the offering is received. For instance, a user may use the remote control to select from available color and sizes, specify a quantity and confirm his or her purchase of the offering. The selection and/or input of one or more parameters or attributes of the offering may be buffered in the display 105 or two way communication system 110. At 270, the indication of the selection or input of one or more parameters or attributes are sent to the service provider 135. The display 105 or two way communication system 110 may then send the selection and/or input of one or more parameters and/or attributes back to the service provider 135 as a bitmap, vector or the like. Additional information, such as a digital certificate, encrypted account identifier and/or encrypted password may also be sent by the two way communication system 110 in response to a given trigger indicating that the user 150 has confirmed the purchase of the offering. The processes of 240-270 may be iteratively performed until enough information to complete or terminate the purchase of the offering has been received from the user 150.

The additional information and selection or input of one or more parameters or attributes may also be sent and received from additional service providers associated with the offering, such as secure electronic payment services, credit card company or banks, or the like Furthermore, the additional information may include purchasing limits or credit limits. In addition, payment may be made through the user's account with the service provider 135. The service provider 135 may also receive revenue from the other vendors for supporting the e-commerce techniques. For example the service provider may receive a fixed fee or percentage of purchase price (e.g., 1% sale) from each transaction.

Furthermore, the data concerning the enhanced content including the offering, triggers, additional information, selections and input of one or more parameters and attributes and the like may be communicated between devices of the multimedia system 105-120 using dynamic allocation of the bandwidth of the HDMI 125, as described in U.S. patent application Ser. No. 11/875,792, Filed Oct. 19, 2007, entitled "CEC Enhancement" which is incorporated herein by reference.

In one implementation, a user 150 may be watching an infomercial or a television shopping channel. Along with the normal content of the infomercial or TV shopping channel, enhanced content may include an icon that is overlaid on the normal content indicating a trigger event such as pressing the "enter" button on the remote to purchase the product being offered at the time. When the user activates the enter button on the remote controller, additional enhanced content may be sent from the service provider. The additional enhanced content may provide choices concerning the selected offering and triggers for selecting or inputting such choices. For example, a graphical user interface overlaid on the normal content may provide pull down menus that may be navigated using the up and down volume buttons on the remote and the key pad may be used to select particular choices from the active pull down menu. Once all choices concerning the offering have been selected by the user using the remote control, the choices can be sent to the service provider 135 or forwarded through the service provider 135 to the vender 145 selling the offering to complete the transaction. No special remote control 120 is necessary to receive information about the offering and/or complete the purchasing transaction. Any CEC compliant remote 120 may be used. Furthermore, the entire process can be completed with the remote 120, without having to also use the telephone or an internet enabled computer to complete the transaction.

In another implementation, a user may be watching a commercial. The commercial may include enhanced content that specifies a trigger. Although, a user may not receive a visual or audio indicator of the prompt, the multimedia may respond to a trigger specified in the enhanced content. In response to activation of the trigger, additional enhanced content may be sent from the service provider 135. The additional enhanced content may replace the original commercial with choices for purchasing the advertised product from one or more retailers or directly from the manufacturer. For example, an advertisement for a new DVD release of a movie may allow the user to purchase the DVD from one or more retailers 145 using the remote control 120 to select from a graphical user interface that overwrites the normal commercial. The user 150 then completes the purchase transaction with the retailer 145 through the service provider 135.

In another implementation, many shows and movies now contain product placements. The enhanced content of the show or movie may specify a trigger. When the user activates the trigger during a given scene additional information concerning offerings associated with one or more product placements in the scene may be displayed in a picture-in-picture pane. The user 150 may use the remote control 120 to navigate the additional information to select and/or input one or more parameters or attributes concerning the offering to complete a purchase transaction for the product featured in a given product placement.

Similarly embodiments of the present technology can also be utilized to address other needs. For example service providers 135 or advertisers 145 could conduct surveys via the television 105. Surveys conducted through the television 105 utilizing enhancements to the CEC protocol can provide a much broader and more diverse sample population than is currently used, thus improving the survey results.

Accordingly, embodiments of the present technology provide an improved buying experience integrated with the television viewing experience. Embodiments also open up new avenues of revenue generation for the service providers and credit companies. Embodiments of the present technology can also provide data for improving targeted advertising, thus improving effectiveness of advertising.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving enhanced content, by a multimedia system from a service provider, wherein the enhanced content includes multimedia content, an offering, and control information concerning a trigger for selecting the offering;
   outputting on a display device of a multimedia system the multimedia content and the offering;
   receiving by the multimedia system the trigger from user activation of a given remote control input indicating selection of the offering;
   sending from the multimedia system an indication of the selection of the offering to the service provider;
   receiving by the multimedia system additional information concerning the offering from the service provider in response to the multimedia system sending the indication of the selection of the offering;
   outputting on the display of the multimedia system the additional information concerning the offering to the user;
   receiving by the multimedia system one or more additional triggers from user activation of one or more remote control inputs indicating selection or input of one or more parameters or attributes concerning the additional information about the offering; and
   sending from the multimedia system an indication of selection or input of one or more parameters or attributes to the service provider.

2. The method according to claim 1, wherein the additional information concerning the offering is received from the service provider as additional enhanced content including control information concerning the one or more additional triggers for selecting or input of the one or more parameters or attributes concerning the additional information.

3. The method according to claim 1, wherein the enhanced content is received by a set top box from the service provider and output on a display device.

4. The method according to claim 3, wherein the enhanced content is communicated from the set top box to the display device using a consumer electronic control (CEC) protocol on a high definition multimedia interface (HDMI).

5. The method according to claim 3, wherein the activation of the given remote control input is encoded using the consumer electronic control (CEC) protocol and communicated from the remote control to the set top box.

6. The method according to claim 3, wherein the activation of the given remote control input is encoded using the consumer electronic control (CEC) protocol and communicated from the remote control to the set top box through the display device.

7. The method according to claim 3, wherein the additional information concerning the offering is received by the set top box from the service provider as additional enhanced content and output on a display device.

8. The method according to claim 7, wherein the additional enhanced content is communicated from the set top box to the display device using the consumer electronic control (CEC) protocol on the high definition multimedia interface (HDMI).

9. A system comprising:
   a means for receiving enhanced content from a server provider, wherein the enhanced content includes multimedia content, an offering, and control information concerning a trigger for selecting the offering;
   a means for outputting the multimedia content and the offering;

a means for receiving the trigger indicating selection of the offering;

a means for sending an indication of the selection of the offering to a service provider;

a means for receiving additional information concerning the offering from the service provider in response to sending the indication of the selection of the offering;

a means for outputting the additional information concerning the offering to the user;

a means for receiving one or more additional triggers associated with selection or input of one or more parameters or attributes concerning the additional information about the offering; and a means for sending an indication of selection or input of one or more parameters or attributes to the service provider.

10. The system of claim 9, wherein the means for outputting the enhanced content and the additional information comprises a monitor.

11. The system of claim 9, wherein the means for receiving the trigger and receiving one or more additional triggers comprises a monitor.

12. The system of claim 9, wherein the means for receiving the trigger and receiving one or more additional triggers comprises a set top box.

13. The system of claim 12, wherein the means for sending the indication of the selection of the offering and for sending the indication of selection or input of one or more parameters or attributes comprises the set top box.

14. The system of claim 13, wherein the set top box is a cable tuner and the service provider is a cable provider.

15. The system of claim 13, wherein the set top box is a satellite tuner and the service provider is a satellite provider.

16. The system of claim 9, further comprising a means for receiving the enhanced content including the offering.

17. The system of claim 9, wherein the means for receiving the enhanced content including the offering and receiving additional information concerning the offering comprises a set top box.

18. The system of claim 17, wherein the enhanced content and additional enhanced content is encoded using a CEC protocol and transferred from the set top box to the monitor across an HDMI.

19. The system of claim 13, wherein the trigger and one or more additional triggers are encoded using a CEC protocol and transferred from the monitor or remote controller to the set top box.

* * * * *